March 25, 1969     D. L. SAGE     3,434,210
DENTAL CLASP
Filed Aug. 29, 1966
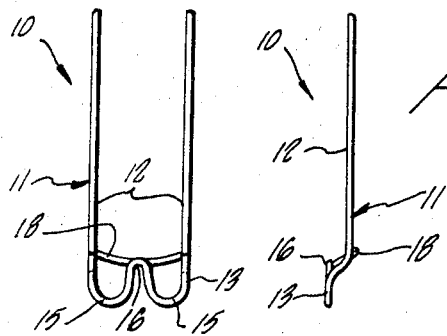
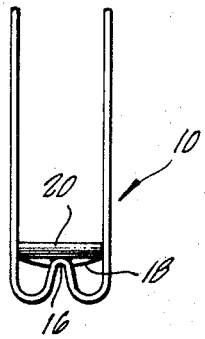
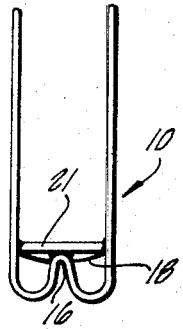
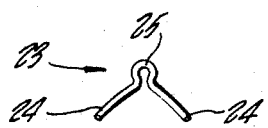
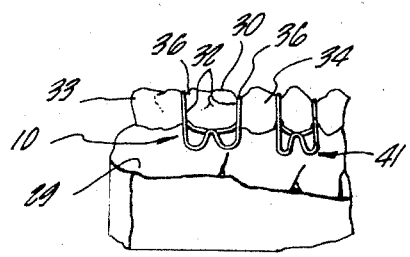
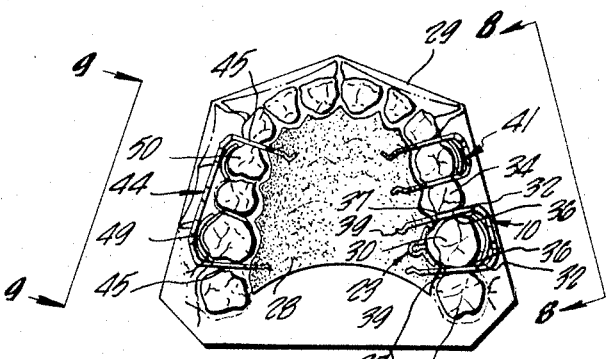
INVENTOR.
DAVID L. SAGE
BY
Christie, Parker & Hale
ATTORNEYS United States Patent Office 3,434,210
Patented Mar. 25, 1969

3,434,210
DENTAL CLASP
David L. Sage, 8729 La Tijera Blvd.,
Los Angeles, Calif. 90045
Filed Aug. 29, 1966, Ser. No. 575,799
Int. Cl. A61c 3/00, 13/12
U.S. Cl. 32—40          6 Claims

ABSTRACT OF THE DISCLOSURE

An improved dental clasp useful to secure removable appliances to teeth. The improved clasp is specifically adapted for machine manufacture, and includes a convoluted portion which permits rapid custom fitting to an individual tooth. A retention arm is secured to the convoluted portion, and the clasp may also include a wire hook or buccal tube adjacent the retention arm.

Background of the invention

Clasps are used in many areas of dental practice to secure removable appliances to teeth. Clasps are particularly useful in orthodontics to position and mount either active appliances used to produce tooth movement, or passive appliances such as orthodontic retainers. Clasps also have utility in prosthodontics, periodontics, pedodontics, and general dentistry to position and secure in place various removable appliances such as temporary partial dentures, space maintainers, temporary splints, and the like.

A popular and effective style of clasp is one commonly referred to as a "Jackson-crib" clasp or "Crozat" clasp. This style of clasp includes a frame formed by the dentist from a length of wire to fit snugly against and over one or more teeth in the patient's dental arch. A retention arm is secured at one end of the wire frame, and is curved to mate smoothly with the gingival contour of a tooth on which the clasp is mounted. The ends of the frame away from the retention arm are bent to fit the occlusal embrasures of the tooth, and are secured in a removable appliance such as a retainer which is supported and secured in place by the clasp.

A problem with the "Jackson-crib" or "Crozat" clasp is that a considerable amount of the dentist's time is required to bend and weld together the several clasp components. For example, it typically takes about ten minutes for a dentist to bend and weld a clasp which matches the contour of a specific tooth. As several clasps may be used on an appliance, the hand-forming technique is a drain on the dentist's time, and results in increased expense to the patient.

It is possible to machine form at least a portion of this style of clasp, but it is impractical to supply a single "universal" clasp model as perhaps a dozen different clasp sizes are required to cover the variation in width of teeth being fitted. That is, a "universal" clasp would require major reforming by the dentist to assure a precise fit, eliminating in large part the advantages of machine manufacture. Although machine-formed clasps could be provided in a dozen or more different sizes to accommodate various sizes of teeth, this approach is impractical due to the ordering and inventory problem presented to both the manufacturer and the dentist.

I have developed a partially pre-formed dental clasp which shares the advantages of a "Jackson-crib" or "Crozat" clasp, and which is readily and very quickly fitted to an individual tooth by the dentist. My clasp is well adapted for machine manufacture in one universal size for molars, and in a second universal size for bicuspid teeth. This clasp includes a wire frame having a convoluted base which defines a series of open loops. These loops extend mesiodistally adjacent the gingival portion of a tooth on which the clasp is to be mounted.

Inclusion of the loops in the frame permits the dentist to vary the width of the clasp to fit a specific tooth by performing minor bends in the frame which can be accomplished in a matter of seconds. Only a single size of clasp need be stocked to fit all molar teeth, and a second size to fit all bicuspid teeth. Tedious hand forming and welding of a major part of the clasp is thereby largely eliminated, and the problems associated with ordering and stocking a large number of clasps of different sizes are avoided.

Briefly stated, the dental clasp of this invention comprises a generally U-shaped wire frame having a pair of spaced-apart elongated legs and a convoluted base joining the legs at an end of the frame. A wire retention arm is spaced from the end of the frame and secured to the convoluted base to extend laterally toward and between the legs. Preferably, the convoluted base is curved to extend out of a plane defined by straight, parallel portions of the frame legs.

In a preferred form, the convoluted base of the frame has at least two first open-loop portions opening away from the end of the frame and at least one second open-loop portion opening toward the end of the frame and joining the first open-loop portions. The retention arm is secured to a peak of the second open-loop portion and has ends which are curved to extend toward the plane defined by the legs. In an alternative form, the clasp may include a wire hook or buccal tube secured to the convoluted base adjacent the retention arm.

The invention will be described in detail with reference to the attached drawings, in which:

FIG. 1 is a front elevation of a partially preformed clasp formed according to the invention;

FIG. 2 is a side elevation of the clasp;

FIG. 3 is a front elevation of the clasp as modified to include a buccal tube;

FIG. 4 is a front elevation of the clasp as modified to include a hook;

FIG. 5 is a front elevation of a spur-shaped auxiliary lingual clasp useful with the clasps shown in FIGS. 1–4;

FIG. 6 is a side elevation of the clasp shown in FIG. 5;

FIG. 7 is a plan view of a stone model of a dental arch, with an acrylic base secured thereto by several clasps formed according to the invention;

FIG. 8 is a view along line 8—8 of FIG. 7; and

FIG. 9 is a view along line 9—9 of FIG. 7.

Referring to FIGS. 1–2, a partially pre-formed dental clasp 10 according to this invention includes a generally U-shaped (as seen in FIG. 1) wire frame 11 having a pair of spaced-apart elongated legs 12. A convoluted base 13 joins the legs at one end of the frame. The convoluted base defines a pair of first open-loop portions 15 which open away from the end of the frame, and a second open-loop portion 16 opening toward the end of the frame and joining the first open-loop portions 15.

Preferably, the U-shaped wire frame is integrally formed from a single piece of wire such as 18–8 stainless steel of about 0.028 inch diameter. Legs 12 are substantially straight and parallel over at least a portion of their length to define a plane, the plane being viewed edge-on in FIG. 2. Convoluted base 13 is bent or curved away from this plane where open-loop portions 15 join respective legs 12. The end of the frame and second open-loop portion 16 are thus spaced from the plane defined by legs 12.

A wire retention arm 18 is secured to second open-loop portion 16 to be spaced from the closed end of the frame. The retention arm is curved to extend between and laterally toward parallel legs 12. Preferably, the retention arm is spot welded to the peak of open-loop portion 16, and a smooth fillet of silver solder is formed between these members to avoid sharp edges or crevices in the finished clasp. The retention arm is formed from a suitable wire material such as 18-8 stainless steel.

The dental clasp is well adapted to support various auxiliary members as may be needed in a specific dental-treatment program. For example, in FIG. 3, a conventional buccal tube 20 is soldered to the peak of second open-loop portion 16 adjacent retention arm 18. In FIG. 4, a straight wire hook 21 is soldered to the second open-loop portion adjacent the retention arm. Hook 21 is especially useful for anchoring elastic bands as used in an orthodontic treatment program, and the hook may of course be formed in other shapes to meet specific requirements. Soldering of these auxiliary members to the dental clasp is readily accomplished without disturbing the alignment of frame 11 and retention arm 18 as these elements are spot welded together and will not separate during the soldering process.

Referring to FIGS. 5 and 6, a generally spur-shaped auxiliary lingual clasp 23 is formed from wire such as 18-8 stainless steel. The auxiliary clasp includes a pair of curved retention arms 24 and a loop portion 25 joining the retention arms. The auxiliary clasp is useful with clasp 10 in certain applications as described below.

Referring to FIGS. 7-9, the dental clasp of this invention is shown as used to position and anchor a dental appliance such as a conventional acrylic plate or base 28. The acrylic base is positioned on a conventional stone model 29 of a dental arch and would be similarly positioned in a patient's mouth. Clasp 10 is shown in engagement with a first molar tooth 30 on the model.

To fit the clasp to a specific tooth, the dentist first adjusts the separation of legs 12 until the legs fit snugly in the buccal interproximal spaces of the tooth. That is, as shown in FIG. 8, legs 12 fit smoothly into buccal interproximal spaces 32 between first molar 30 and an adjoining second molar 33 and second bicuspid 34. This width adjustment is easily and quickly accomplished by opening or closing one or more of open-loop portions 15 and 16. That is, these open-loop portions allow legs 12 to be readily contracted or expanded toward or away from each other without completely reforming the clasp. Retention arm 18 is also adjusted so the ends of the arm contact the tooth smoothly along the gingival area below the height of contour or enlarged midportion of the tooth.

Legs 12 of the dental clasp are then bent toward the center of the arch to fit snugly into occlusal embrasures 36 between first molar 30 and the adjoining teeth. The legs are then again bent toward the gingival area of the lingual side of the tooth to fit smoothly into lingual interproximal spaces 37 between first molar 30, second molar 33 and second bicuspid 34. Finally, the legs are bent toward the center of the arch away from the tooth and curved to define retention portions 39 at their ends. The ends of the legs are embedded in acrylic base 28, and curved retention portions 39 seat within the base and resist any tendency for the legs to become dislodged.

If the tooth on which the clasp is mounted is not fully erupted, or has a short clinical crown, auxiliary lingual clasp 23 is useful in combination with clasp 10 to provide an even more secure anchor for the acrylic base. As shown in FIG. 7, arms 24 of the auxiliary lingual clasp are formed to fit snugly against the lingual gingival area of first molar 30. Loop portion 25 is then embedded in the acrylic base so the retention arm of clasp 10 and arms 24 of the auxiliary lingual clasp cooperate to grip the gingival area below the height of contour on both the lingual and buccal sides of the first molar.

The dental clasp of this invention can also be made in a smaller size to fit the bicuspid teeth in the dental arch. A bicuspid clasp 41 is shown in FIGS. 7 and 8, and is identical to clasp 10 already described other than being slightly scaled down in size.

The dental clasp of this invention can also be formed to span two or more teeth, and a multiple-tooth clasp 44 is shown in FIGS. 7 and 9. Clasp 44 includes a pair of elongated legs 45, a convoluted base 46, and a pair of retention arms 47 secured to the convoluted base and spaced apart to clasp the gingival areas of a first molar 49 and a first bicuspid 50.

Bending the convoluted base of the clasp out of the plane defined by parallel legs 12 provides clearance between the convoluted base and the sensitive gum tissue at the base of a tooth on which the clasp is mounted. Preforming of this curvature avoids the need for time-consuming custom forming by the dentist, and provides a comfortable appliance for the user.

There has been described an improved dental clasp which can be manufactured in a single size for a specific group of teeth (such as the bicuspid group or molar group) and then readily adapted by the dentist to fit individual teeth. Provision of the convoluted base permits the dentist or a technician to perform the final fitting very quickly, and stocking of perhaps a dozen different sizes of clasps is avoided. Although the clasp has been illustrated in combination with an acrylic base, it is to be understood that it can be used with many different types of dental appliances such as temporary partial dentures, space maintainers, and the like. The clasp can also be mounted with the retention arm on the lingual side of the tooth and used to support an appliance which extends on the buccal or labial side of the tooth.

I claim:
1. A dental clasp, comprising
   a generally U-shaped wire frame including a pair of spaced-apart elongated legs having straight, parallel portions defining a plane, and a convoluted base joining the legs at an end of the frame, the base being curved to extend out of the plane defined by the leg portions; and
   a wire retention arm spaced from said end of the frame and secured to the convoluted base to extend laterally toward and between the legs.

2. The dental clasp defined in claim 1 in which the convoluted base has at least two first open-loop portions opening away from said end of the frame and at least one second open-loop portion opening toward said end of the frame and joining the first open-loop portions, and in which the retention arm is secured to a peak of the second open-loop portion and has ends which are curved to extend toward the plane defined by the legs.

3. The dental clasp defined in claim 2 and further comprising a wire hook secured to the convoluted base adjacent the retention arm to extend laterally toward the legs.

4. The dental clasp defined in claim 2 and further comprising a buccal tube secured to the convoluted base adjacent the retention arm to extend laterally toward the legs.

5. The dental clasp defined in claim 2 in which the convoluted base includes at least two second open-loop portions, and further comprising a second wire retention arm, the retention arms being laterally spaced apart and secured to respective second open-loop portions.

6. The dental clasp defined in claim 2 and further comprising an acrylic base in which are secured the ends of the legs away from the convoluted base, and a generally spur-shaped wire auxiliary clasp embedded in the base and having arms which extend out of the base toward the retention arm.

References Cited

UNITED STATES PATENTS

| | | | |
|---|---|---|---|
| 733,320 | 7/1903 | Griswold | 32—5 |
| 1,193,034 | 8/1916 | Lokey | 32—5 |
| 3,111,758 | 11/1963 | Winkler | 32—14 |

ROBERT PESHOCK, *Primary Examiner.*